United States Patent [19]

Mayer

[11] Patent Number: 4,651,127

[45] Date of Patent: Mar. 17, 1987

[54] SAFETY BELT PROMPTING DEVICE FOR MOTOR VEHICLES

[75] Inventor: Günter Mayer, Pfungstadt, Fed. Rep. of Germany

[73] Assignee: Gesine Mayer, Stockstadt, Fed. Rep. of Germany

[21] Appl. No.: 631,938

[22] Filed: Jul. 12, 1984

[51] Int. Cl.⁴ .............................................. B60Q 1/00
[52] U.S. Cl. ................................ 340/52 E; 340/52 D; 200/61.58 B; 307/10 SB
[58] Field of Search ...................... 340/53, 52 E, 52 R, 340/636, 52 D; 116/57; 307/10 SB; 200/61.58 B

[56] References Cited

U.S. PATENT DOCUMENTS

| | | | |
|---|---|---|---|
| 3,836,955 | 9/1974 | Cracraft et al. | 340/52 E |
| 3,930,555 | 1/1976 | Iijima | 340/52 E |
| 3,962,677 | 6/1976 | Miesterfeld et al. | 340/52 E |
| 4,096,468 | 6/1978 | Kopera, Jr. | 340/52 E |
| 4,327,352 | 4/1982 | Cerruti | 340/52 R |

FOREIGN PATENT DOCUMENTS

| | | |
|---|---|---|
| 2146085 | 3/1973 | Fed. Rep. of Germany . |
| 8224439 | 2/1983 | Fed. Rep. of Germany . |
| 603382 | 8/1978 | Sweden ............................ 340/52 E |
| 1547559 | 6/1979 | United Kingdom . |

OTHER PUBLICATIONS

"Seat Belt Indicator for Vehicles", *Electronics Today International,* Aug. 1979, vol. 8, #8, p. 103.

Primary Examiner—James L. Rowland
Assistant Examiner—Jeffery A. Hofsass
Attorney, Agent, or Firm—Michael J. Striker

[57] ABSTRACT

The prompting device for safety belts in a motor vehicle comprises a sensor for sensing battery voltage drop during actuation of a starter of the motor vehicle. The sensed voltage drop is converted into a binary signal which is stored in a storing device. After termination of the starting process when the engine is running and driving a loading generator, the stored binary signal activates via a timing switch an optical and/or acoustical indicator prompting the user of the vehicle to fasten the seat belts.

10 Claims, 2 Drawing Figures

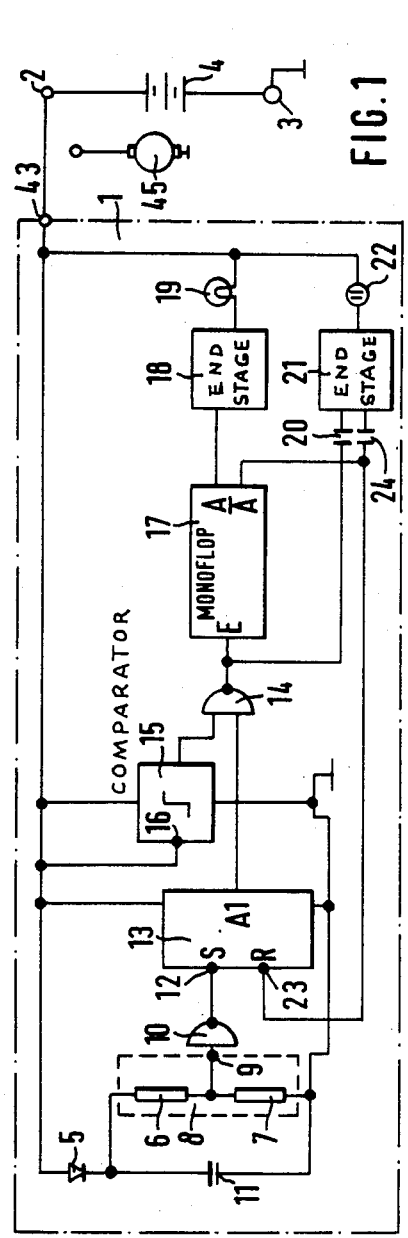
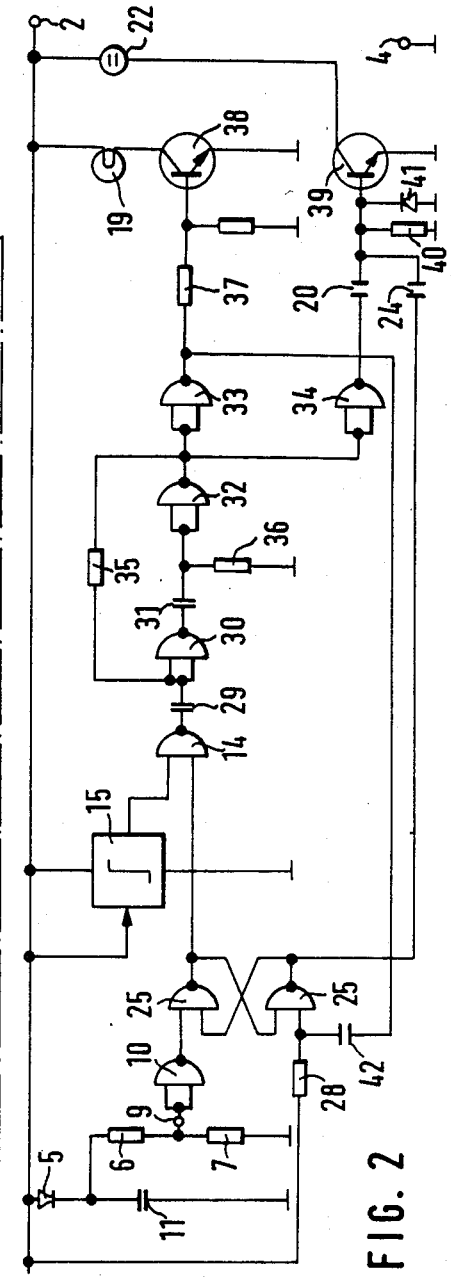
FIG. 1
FIG. 2

SAFETY BELT PROMPTING DEVICE FOR MOTOR VEHICLES

BACKGROUND OF THE INVENTION

The present invention relates in general to an alarm device and in particular to a safety belt prompting device for use in a motor vehicle having an engine, a battery, a starter connectable to the battery, a generator for loading the battery, and safety belts.

In motor vehicles, there are employed numerous sensors which detect certain operational conditions of the motor vehicle. For example, the rotary speed of the wheels is detected by means of tachometer connected to an indicator of the speed of the motor vehicle. Another indicator indicates oil level in the engine, for example at a low level of oil an indicator is activated. Another sensor monitors whether electric consumers in the vehicle polar supplied from the battery or from the generator. In the former case a warning light is on to indicate danger of discharging the battery.

SUMMARY OF THE INVENTION

It is an object of this invention to provide a warning device for use in a motor vehicle of the before-described kind by means of which the user of the motor vehicle is automatically prompted to fasten safety belts.

In particular, it is an object of the invention to remind the driver of the safety belts after starting the engine and before the beginning of the travel.

Another object of this invention is to provide such an improved warning device which does not require any additional user actuated switch for its operation.

In keeping with these objects and with others which will become apparent hereafter, one feature of the invention resides, in a prompting device for use in connection with safety belts of a motor vehicle of the aforedescribed kind, in a combination which comprises means for sensing battery voltage drop during actuation of the starter of the motor vehicle, means for assigning a first binary signal to a sensed level of the voltage drop, means for storing the first binary signal, means for generating a second binary signal when the starter is interrupted, means for producing an output signal in response to the simultaneous occurrence of the first and second binary signals, and indicator means for producing, for a predetermined period of time, an optical and/or accoustical alarm signal prompting the user of the motor vehicle to fastening the safety belts.

This novel arrangement utilizes the drop in the battery voltage during the high consumption of electric current by the starter, to release an optical or accoustical alarm prompting the fastening of safety belts. The alarm is released only after the starting of the engine and before the beginning of the drive. In the case that the user of the motor vehicle forgets to fasten the safety belts, the prompting message can be repeated before the vehicle is set in motion.

Preferably, the indicator means generates a continuous or intermittent luminous fluttering such as "FASTEN SEATBELTS" or the like. The accoustical signal is preferably for example the sound of a gong, a humming noise or a whistling signal which draws the attention to the indicators in the motor vehicle. In this manner, the user of the vehicle is prompted to inspect the warning indicators and follow the activated luminous message urging to use the safety belts.

In the preferred embodiment of this invention, at the beginning of the optical and/or accoustical message a timing delaying circuit is activated which after a predetermined time period automatically disconnects the optical and/or accoustical signal. Preferably, the delay time period is adjusted so as to match the average time necessary for putting on the seat belts. For example, the delay time is set for 10 to 15 seconds.

In the preferred embodiment, there is provided a switching element coupled to the safety belts in such a manner that after closing the safety belts the optical or accoustical alarm signal is switched off. The switching element is preferably arranged in the lock on the safety belt in such a manner that it is switched off only during the locked grip of the belt. The switching element is connected to a source of a resetting which is applied to the resetting input of the storage device whereby the latter is cleared. After the clearance of the storage device the optical and accoustical signal is terminated.

This switching element is provided at least in the safety belt arranged at the seat of the operator of the vehicle inasmuch during the travel at least one person is present in the car. For the switches in the remaining safety belts there can be provided a simple short circuiting switch operated by the driver when no other passengers are in the car.

In the preferred embodiment of the this invention the means for generating the second binary signal includes comparator which monitors the battery voltage and when the voltage rises after the starter is disconnected, the comparator delivers an output signal corresponding the second binary signal which is applied to one input of an NAND gate whose other input is connected to the storing means. The output signal released by the NAND gate is applied to the indicator means. The comparator is set for comparing the battery voltage with a predetermined voltage level and generates the second signal when the preset voltage level is exceeded. The voltage level is preferably adjusted to a charging voltage generated by the generator and supplied to the battery during idling speed of the engine.

The sensing means is preferably in the form of a battery voltage divider whose tapping point is connected via a signal inverting stage to the input of the storing means. The signal inverting stage thus produces the first binary signal which is fed into the storing means.

With advantage, the voltage divider, is bridged by a capacitor and is connected to the battery via a diode oriented in forward direction with respect to the battery pole. When the starter is activated the battery voltage strongly decreases. The diode prevents the discharge of the bridging capacitor into the battery. Instead, the capacitor discharges through the voltage divider. When the battery voltage due to the high current consumption by the starter drops below a certain limit, then the divided voltage at the tapping point of the voltage divider reaches a value to which a binary value, for example "1" has been assigned. This "1" binary value is inverted in the signal inverting stage into a binary value "0" which is applied to the setting input of the storing device. The parallel connection of the capacitor and the voltage divider guarantees that an accurately predictable discharging process takes place which is not influenced by the momentary conditions on the battery provided that the battery voltage is less than the combined voltage across the capacitor at the diode.

Preferrably, the storing means is in the form a SR-flipflop which is set by the ∅ (first) binary signal and reset by a time delay resetting signal produced by a time delay circuit. In this manner a very simple structure is obtained.

The time delaying is preferably in the form a monoflop or monostable multivibrator whose input is connected to the output of the gating means and whose output is connected to the indicator means for releasing the luminous and accoustical indication.

The novel features which are considered as characteristic for the invention are set forth in particular in the appended claims. The invention itself however both as to its construction and its method of operation together with additional objects and advantages thereof will be best understood from the following description of specific embodiments when read in connection with the accompanying drawing.

BRIEF DESCRIPTION OF THE DRAWING

FIG. 1 is a block circuit diagram of a safety belt prompting device according to this invention; and FIG. 2 is a detailed circuit of the embodiment of FIG. 1.

DESCRIPTION OF THE PREFERRED EMBODIMENT

The prompting device 1 for use in connection with safety belts in a motor vehicle has its terminals connected to poles 2 and 3 of a battery 4 of an non-illustrated motor vehicle which includes a starter 45 connectable to the poles of the battery by an ignition key during starting of the engine of the motor vehicle. The pole 2 is a positive pole while the negative pole 3 of the battery is grounded. A diode 5 has its anode connected to the positive pole 2 and its cathode is connected to a voltage divider 8 consisting of two resistors 6 and 7. The tapping point 9 of the voltage divider 8 is connected to a signal inverting stage 1∅ which in this example is an end gate having its inputs connected together. A capacitor 11 is connected parallel to the voltage divider 8. The connection point of the capacitor 11 and the resistor 7 is connected to the ground. The output the signal inverting stage 1∅ is connected to the setting input S of a storing device 13. The output A1 of the storing device 13 is connected to one input of a NAND gate 14. The other input of a NAND gate 14 is connected to positive pole 2. The output of the NAND tor 15 in the form of a Schmitt-trigger has its power supply terminals connected to the poles 2 and 3 of the battery 4. The input 16 of the comparator 15 is connected to the positive pole 2. The ouptut of the NAND gate 14 is connected to an input E of a monoflop or monostable multivibrator 17 whose non-inverting output A is connected to the input of a power end stage 18 which drives a light indicator 19. The light indicator can be in the form of a lamp for example arranged behind an opaque plate provided with light permeable inscription such as "FASTEN SEAT BELT".

The output of the NAND gate 14 is also connected via a capacitor 2∅ to the input of a second power end stage 21 whose output activates an accoustical alarm such a gong 22 for example. The inverting output A of the monoflop 17 is connected at point 23 to resetting input R of the storage device 13 and via a capacitor 24 to another input of the power end stage 21. As mentioned before the storage device 13 (RS-flipflop) is constructed for example of two cross-coupled NAND gates 25 as illustrated in FIG. 2. Power supply terminals of the storage device 13 can be connected to a power source via an additional diode. Preferably, a capacitor is connected parallel to the power supply terminals of the device 13 and of the signal inverting stage and this capacitor is loaded via the additional diode.

When the starter 45 is activated, the resulting current consumption causes a voltage drop across the battery 4. Capacitor 11 which has been charged to the full voltage of the battery, is prevented from discharge back into the battery by the diode 5 which relative to the positive pole 2 is connected in reverse direction. Therefore, the capacitor 11 discharges through the voltage divider 8 whereby voltage across the capacitor 11 diminishes according to an expotential function. The dividing ratio of resistors 6 and 7 is adjusted such that the divided voltage at the tapping point 9 drops in the course of the discharge below the original level which corresponds to a binary signal "1" assigned to the signal inverting stage 1∅. Accordingly, the signal stage (NAND gate) inverts the "1" input binary signal into a "∅" output binary signal which is applied at point 12 to the setting input S of the storage device 13 and a binary signal "1" is stored at the output A1 of the storing RS-flipflop 13. Due to the continuous gradual decrease of voltage across capacitor 11, the "∅" condition at the setting input of the storage device is preserved for prolongated period of time. The elements 1∅ and 13 are preferably CMOS devices which consume only a minute amount of current. The elements 1∅ and 13 can operate at voltages which fluctuate in broad limits. As described, the output A1 of the storage device 13 is applied to one input of the NAND gate 14. When after an interruption of the circuit supplied to the starter 45 the battery voltage resumes its initial higher value, the comparator 15 responds to this voltage jump. The threshold voltage of the comparator is set to a value corresponding to a relatively strong discharge of the battery 4. Preferably, the threshold reference voltage of the comparator is set to a value corresponding to a voltage level generated by an non-illustrated generator in the motor vehicle. In this case, comparator 15 is actuated as soon as the generator of the engine starts loading the battery. The battery signal at the output of the comparator 15 is applied to one of the inputs of the NAND gate 14 and makes the same conductive. As a result, the output signal from the gate 14 is applied to the input E of the monoflop 17 and simultaneously via capacitor 2∅ to the input of power end stage 21 to generate an output power pulse which activates the gong 22. Simultaneously, a time delayed output signal from the non-inverting output A of the monoflop 17 is applied to the power end stage 18 which energizes the light indicator 19. In this manner, by the sound of the gong and by the subsequent illumination of the lamp indicator 19 the passengers of the motor vehicle are prompted to fasten the safety belts. The predetermined time interval during which the monoflop changes its state afer the application of the output signal from the gate 14 is adjusted to correspond to an average time which is necessary for users to fasten the belts. After the expiration of the time delay interval the non-inverting output signal A returns to its original state and consequently the power end stage 18 is blocked and the light indicator 19 is extinguished. At the same time, a high signal develops at the inverting output $\overline{A}$ of the monoflop which is applied to the resetting input 23 of the storage 13 and the latter is cleared.

A more detailed construction of the circuit of FIG. 1 is illustrated in FIG. 2 whereby like elements designated by the same reference numerals. The NAND gate 10 has its both inputs connected to the common point 9 of the voltage divider 6 and 7. The output of the NAND gate 10 is connected to an input of a NAND gate 25 whose other input is connected to the output of another NAND gate 25' and to an input of still another NAND gate 14. An input of the NAND gate 25' is connected via a resistor 28 to the plus pole to the battery and the output of the NAND gate 25' is connected to the other input of the NAND gate 25 and via a capacitor 24 to the base of a power transistor 39. The cross-coupled NAND gates 25 and 25' form together the storing device 13 of FIG. 1. The output of NAND gate 14 is connected via a capacitor 29 to both inputs of a NAND gate 30 whose output is coupled via capacitor 31 to both inputs of a NAND gate 32. The output of a NAND gate 32 is connected to both inputs of respective gates 33 and 34 and via a feedback resistor 35 to the inputs of the NAND gate 30. A resistor 36 connects the inputs of the NAND gate 32 to the minus pole 3 of battery 4 and to the ground. The output of NAND gate 33 is connected via resistor 37 to the base of a transistor 38 whose collector-emitter circuit includes the indicator lamp 19. The output of NAND gate 34 is connected via capacitor 20 to the base of the transistor 39 whose collector-emitter circuit includes an accoustic alarm device for example in the form of an electronic gong 22. The base of transistor 39 is further connected via a parallel connection of a resistor 40 and a diode 41 to the ground and via the before-mentioned capacitor 24 to the output of the NAND gate 25'. The output of NAND gate 33 is further connected via a capacitor 42 to the connection of the resistor 28 and the input of the NAND gate 25'.

The circuit including the elements 29 through 36 forms a monoflop or monostable multivibrator 17 of FIG. 1. In a rest condition, the output of the NAND gate 32 is at a potential and so is the input of NAND gate 30. Accordingly, the output of NAND gate 30 is at a low potential. When the input of NAND gate 30 changes its state to a low one due to a pulse through capacitor 29, resulting high potential at the output of NAND gate 30 loads the capacitor 31 and as a result, the input of NAND gate 32 is brought to a high potential while thus changing the state at the output of the NAND gate 32 and the resulting low potential is fed back via resistor 31 to the input of the NAND gate 30. The charged capacitor 31 is discharged according to a predetermined time constant through the resistor 36 whereby the input of NAND gate 32 is again brought with a certain time delay to the low potential. Consequently the high potential at the output of NAND gate 32 is restored and so is the initial rest condition of the entire monoflop circuit. When the potential at the output of NAND gate 32 is low, the outputs of NAND gates 33 and 34 are at a high potential. The high potential at the NAND gate 33 renders the transistor 38 conductive. The rise of the output signal at the NAND gate 34 momentarily switches on via the capacitor 20 the transistor 39 until the capacitor 20 is discharged via resistor 40. In this manner, the electronic gong is momentarily activated.

In the rest condition the input of NAND gate 14 which is connected to the output of NAND gate 25, is at a low potential. The three inputs of respective NAND gates 25 and 25' on the other hand are at a high potential. As soon as the tapping point 9 of the voltage divider 6 and 7 drops below a predetermined level due to the battery voltage drop caused by the actuation of the starter of the engine, this change in the divided voltage causes a changeover of state at the NAND gate 10 whereby a 0 potential is applied by to the input of NAND gate 25. The resulting high potential at the output of NAND gate 25 causes the switchover of NAND gate 14 to a low potential which triggers the monoflop 17 provided that the generator of the engine becomes activated and comparator 15 delivers a high signal corresponding to the generator voltage. After the expiration of the delay time period determined by the monoflop 17 the resulting output pulse is supplied via capacitor 24 to the SR-flipflop consisting of the two NAND gates 25 and 25' and the latter is reset into its rest condition.

The before described switch activated by the locking of the safety belts is preferably provided in the conduit leading from the capacitor 24 to the storing device 25 and 25'. In this case, no time delaying bistable multivibrator 17 is necessary. This switch or switches can be coupled to a speed recording apparatus arranged if desired in the motor vehicle which records the times needed for fastening the belts.

It will be understood that each of the elements described above or two or more together may also find a useful application in other types of constructions differing from the types described above.

While the invention has been illustrated and described as embodied in a specific example of a prompting device for safety belts, it is not intended to be limited to the details shown since various modifications and structural changes may be made without departing in any way from the spirit of the present invention.

Without further analysis the foregoing will so fully reveal the gist of the present invention that others can by applying current knowledge readily adapt if for various applications without omitting features that from the standpoint or prior art fairly constitute essential characteristics of the generic or specific aspects of this invention.

What is claimed as new and desired to be protected by Letters Patent is set forth in the appended claims:

1. A prompting device for use in connection with safety belts of a motor vehicle, the vehicle including a battery, a starter connectable to the battery and a generator for loading the battery, the prompting device comprising means for sensing battery voltage drop during actuation of the starter, means for producing a first binary signal in response to a sensed voltage drop, means for storing the first binary signal, means for generating a second signal when the starter is interrupted, means for producing an output signal in response to the simultaneous occurrence of the first and second binary signals, indicator means for producing, for a predetermined period of time, an optical and/or accoustical alarm signal prompting the user of the motor vehicle to fasten the safety belts, said means for generating the second binary signal including a comparator arranged for comparing the battery voltage with a threshold voltage, said means for producing an output signal including a NAND gate having a input connected to the comparator and another input connected to the storing means, said generator generating a voltage which exceeds the battery voltage during idling run of the engine, and said threshold voltage level of the comparator corresponding to the generator voltage.

2. A prompting device as defined in claim 1 wherein the indicator means includes continuously or intermittently illuminated prompting signal.

3. A prompting device as defined in claim 1 comprising time delay switching means activated by the output signal for actuating the indicator means and disconnecting the same after a predetermined period of time.

4. A prompting device as defined in claim 1 comprising switching means controlled by the safety belts to disconnect the indicator means when the safety belts are fastened.

5. A prompting device as defined in claim 1 wherein said sensing means includes a voltage divider coupled across the battery and having a tapping point connected to the input of the storing means.

6. A prompting device as defined in claim 5 wherein the voltage divider is connected parallel to a capacitor and in series with a diode connected for loading the capacitor from the battery.

7. A prompting device as defined in claim 5 wherein said means for producing the first binary signal includes an inverter connected between a tapping point of the voltage divider and the storing means.

8. A prompting device as defined in claim 1 wherein the storing means includes a SR-flipflop having a setting input connected to the means for producing the first binary signal and a resetting input connected to a time delay switching means.

9. A prompting device as defined in claim 3 wherein the time delay switching means is a monostable multivibrator.

10. A prompting device as defined in claim 4 wherein the switching means coupled to the safety belt is further coupled to a drive recorder for recording the duration of the fastening process of the safety belts.

* * * * *